United States Patent [19]

Miyazono et al.

[11] Patent Number: 4,990,571
[45] Date of Patent: Feb. 5, 1991

[54] COMPOSITE RESIN PARTICLES AND PREPARATION THEREOF

[75] Inventors: Tadafumi Miyazono; Akio Kashihara, both of Osaka; Shinichi Ishikura, Kyoto, all of Japan

[73] Assignee: Nippon Paint Co., Ltd., Osaka, Japan

[21] Appl. No.: 322,057

[22] Filed: Mar. 13, 1989

Related U.S. Application Data

[62] Division of Ser. No. 40,477, Apr. 20, 1987, Pat. No. 4,833,189.

[30] Foreign Application Priority Data

Apr. 18, 1986 [JP] Japan .................................. 61-090828

[51] Int. Cl.[5] ........................................... C08F 275/00
[52] U.S. Cl. .................................... 525/274; 525/286; 525/293; 525/296; 525/301; 525/302; 525/304; 525/308; 525/309; 525/313; 525/316; 525/322; 525/324
[58] Field of Search ........................................ 525/274

[56] References Cited

U.S. PATENT DOCUMENTS 3,522,222  7/1970  Taylor ................................. 525/274
4,150,067  4/1979  Dawans et al. ..................... 525/274

Primary Examiner—Jacob Ziegler
Attorney, Agent, or Firm—Wenderoth, Lind & Ponack

[57] ABSTRACT

Composite resin particles each comprising a particulate crosslinked polymer to which a number of substantially linear, metal-containing polymer chains are chemically bonded. The invention also provide methods for the preparation of said composite resin particles. The present composite resin particles have self-film forming properties, can give a stable dispersion in an organic solvent or a resinous varnish and are specifically useful in paint industries. The particles are further characterized by having the desired properties of the metal element contained therein, as, for example, self-catalytic function in crosslinking, excellent biological activities and the like.

3 Claims, No Drawings

COMPOSITE RESIN PARTICLES AND PREPARATION THEREOF

This application is a division of Ser. No. 07/040,477, filed Apr. 20, 1987.

FIELD OF THE INVENTION

The present invention relates to novel crosslinked composite resin particles and preparation thereof. More particularly, the invention concerns composite resin particles which are specifically useful in coating compositions and preparation of such resin particles.

BACKGROUND OF THE INVENTION

Granular resins are supplied in the forms of emulsions, microgels, non-aqueous dispersion resins (AND resins), powder resins and the like, and have been watched with keen interest in paint industries, especially in aqueous paints, high solid paints and powder paints, because of measuring up to the social requirements of economization of natural resources, energy saving and conservation of good surroundings.

However, such a resin is usually crosslinked so that the characteristics of the resin particles can be fully developed, and therefore, when the granular resin is used alone, it is unable to yield a uniform or excellent film and the resulted film has a serious drawback of deficient film appearance.

Even when the granular resin is combined with a soluble type resin, there is a case that the viscosity of the mixture is unduly increased as compared with that of said soluble type resin alone, due to the considerable interaction between the surfaces of said granules and the soluble type resin. Therefore, great care is often required in the actual use of such combination of resins.

Furthermore, since the characteristics of crosslinked resins are greatly influenced by the nature of surfactant used, crosslinking degree and combination of constituting monomers and the like, heretofore proposed crosslinked resin particles are hardly dispersible in such medium as aliphatic hydrocarbons, high boiling aromatic hydrocarbons, high polar solvents or the like and once they form agglomerates, hardly get loose back to the primary particles. Thus, considerable difficulties are always encountered in the actual applications thereof.

Therefore, an object of the invention is to provide novel composite resin particles which are free from the drawbacks of the abovementioned resin particles. Thus, a principal object of the invention is to provide novel composite resin particles which can be used either singularly or in combination form with any other resins customarily used in paint industries, to give excellent coating compositions with good application characteristics and storage stability and capable of resulting in a uniform coating with excellent appearance.

An additional object of the invention is to provide novel composite resin particles having self-catalytic function in crosslinking or having excellent biological activities.

SUMMARY OF THE INVENTION

The inventors have now found that composite resin particles each of which comprises a particulate crosslinked polymer to which a number of substantially linear metalcontaining polymer chains are chemically bonded are quite useful in paint industries because of having comparatively lower solution viscosities, being able to give a uniform coating even when it is used alone, and being excellent in compatibility with other resins and solvents. The inventors have also found that the abovesaid composite resin particles have a self-catalytic function in crosslinking or useful biological activities depending on the type of metallic element contained. On the basis of these findings, the inventors have succeeded in arriving at the present invention.

The present composite resin particle has a core-shell structure, the core portion being composed of crosslinked polymer and having a mean diameter of 0.01 to $10\mu$ and the shell portion being composed of substantially linear metalcontaining polymer chains, one end of the respective polymer chains being chemically bonded to said polymer in said core portion. In the present specification and claims, the term "metallic element" or "metal" shall mean the elements on the left side of the line linking B with Si, As, Te and At, in the long form of the Periodic Table, excluding the members on said line. The term "polymer" shall include both condensation type polymer such as polyester resin, epoxy resin, amino resin and the like, and polymerization type polymer such as acrylic resin, vinyl resin and the like. Since the linear polymer chain may include a certain degree of branching or crosslinking, depending on the intended application, the term "substantially linear" shall mean a polymer chain which is essentially a linear polymer admitting the presence of a degree of branching or crosslinking therein. The present composite resin particles may be obtained by providing microparticles of crosslinked polymer bearing appropriate functional groups and reacting the same with a reactive derivative of metal-containing linear polymer, thereby bonding the linear polymer chain to the core polymer. The composite resin particles may also be prepared by the method wherein addition polymerizable unsaturation bonds are introduced to the particulate crosslinked polymer, during or after formation thereof, and a metalcontaining addition polymerizable ethylenic compound and other optional polymerizable ethylenic compounds are then reacted with the said particulate polymer, thereby forming the desired linear polymer chains chemically bonded to the same.

In another method, the present composite resin particles may be obtained by first preparing the crosslinked polymer microparticles to which linear polymer chains are chemically bonded, and then reacting an organic metal compound with the said microparticles to introduce the metal element into the linear polymer chains through esterification or esterexchange reaction.

However, in the present invention, the most important composite resin particles are, from the standpoint of application range and ease of preparation, the composite acrylic resin particles each comprising a particulate crosslinked acrylic polymer, to which a number of substantially linear, metal-containing acrylic polymer chains are chemically bonded. Such particles may be advantageously prepared by the following methods. That is, in the first method, a monomer mixture of a polyfunctional monomer containing two or more polymerizable ethylenic groups each having different co-reactivity, and polymerizable monomers including a crosslinking monomer which are reactive with one ethylenic group of said polyfunctional monomer, is subjected to an emulsion polymerization to obtain an emulsion of particulate materials of crosslinked polymer still having the other ethylenic group of said polyfunctional monomer in a free state in the polymer, and after adding a polymerizable monomer reactive with the other ethylenic groups still remaining in the aforesaid particulate materials, a metalcontaining monomer and other optional polymerizable monomers, a graft polymerization is effected to form substantially linear, metal-containing acrylic polymer chains.

In another method, the abovesaid second step is effected without using the metal-containing monomer and thus obtained composite acrylic resin particles are treated with a metallic compound to introduce the metal element into the substantially linear acrylic polymer chains through esterification or ester-exchange reaction. The term "polymerizable ethylenic groups each having different co-reactivity" shall mean the combination of ethylenic groups, one being of selective nature towards the type of employable comonomers such as in 1,2-di-, 1,1,2-tri- or 1,1,2,2-tetra-substituted ethylene and the other having no such properties such as in mono- or 1,1-di-substituted ethylene group, the combination of ethylenic groups, one being able to give homopolymer and the other not being so able, and the combination of ethylenic groups each having different reactivity.

In this invention, any polyfunctional monomer having in its molecule two or more of the abovementioned ethylenic groups may be advantageously used in the preparation of the present composite resin particles. Examples of such monomers are allyl (meth) acrylate, addition product of allyl glycidyl ether and acrylic or methacrylic acid, addition product of monoallyl amine or diallyl amine and glycidyl (meth) acrylate or (meth) acryloyl bearing isocyanate, addition product of allyl alcohol and (meth) acryloyl bearing isocyanate, addition product of maleic acid or fumaric acid and glycidyl (meth) acrylate, addition product of maleic or fumaric monoester and glycidyl (meth) acrylate, and addition product of unsaturated fatty acid and glycidyl (meth) acrylate.

Among the various ethylenic groups, the unsaturation bonds included in maleic or fumaric acid, or derivatives thereof, i.e. 1,1-di-, 1,1,2-tri-, or 1,1,2,2-tetra-substituted ethylenic groups, are selectively reactive with polymerizable aromatic compounds, whereas the unsaturation bonds included in acryloyl or methacryloyl groups, i.e. mono- or 1,1-di-substituted ethylenic groups are nonselective in the type of employable comonomers. Therefore, in a most preferable embodiment, the former is used for the preparation of linear polymer chains and the latter is used for the preparation of crosslinked core polymer. Examples of such particularly useful monomers having in its molecule one or more radically polymerizable mono- or 1,1-di-substituted ethylenic unsaturation bonds and one or more radically polymerizable 1,2-di-, 1,1,2-tri- or 1,1,2,2-tetra-substituted ethylenic unsaturation bonds, are addition product of maleic acid and glycidyl acrylate, addition product of maleic acid and glycidyl methacrylate, addition product of fumaric acid and glycidyl acrylate, addition product of fumaric acid and glycidyl methacrylate, addition product of maleic acid monoester and glycidyl acrylate, maleic acid monoester and glycidyl methacrylate, addition product of fumaric acid monoester and glycidyl acrylate, addition product of fumaric acid monoester and glycidyl methacrylate, addition product of substituted maleic acid and glycidyl (meth) acrylate, addition product of substituted maleic acid monoester and glycidyl (meth) acrylate, addition product of substituted fumaric acid and glycidyl (meth) acrylate, and addition product of substituted fumaric acid monoester and glycidyl (meth) acrylate. The abovesaid polyfunctional monomer is combined with other $\alpha,\beta$-ethylenic monomers including a crosslinking monomer and the mixture is subjected to an emulsion polymerization to prepare the particulate crosslinked acrylic polymer. As a crosslinking monomer, any of the known compounds having in its molecule two or more radically polymerizable ethylenic unsaturation bonds may be satisfactorily used, as, for example, a polymerizable unsaturated monocarboxylic acid ester of polyhydric alcohol and a polymerizable unsaturated alcohol ester of polycarboxylic acid. Alternatively, use can be made of a combination of compounds each having a mutually reactive functional group and one or more $\alpha,\beta$-ethylenically unsaturation bonds, as, for example, (meth) acrylic acid and glycidyl (meth) acrylate; hydroxy (meth) acrylate and isocyanate alkyl (meth) acrylate (blocked compound); and radically polymerizable silane coupling agents such as vinyl trialkoxy silane and (meth) acryloxyalkyl trialkoxy silane and the like. Other $\alpha,\beta$-ethylenic monomers may be any type of compounds customarily used in the preparation of acrylic resin. However, in order to leave the maleic type double bonds in free form in the resulted polymer, a polymerizable aromatic compound capable of showing a selective reactivity towards said double bonds should be excluded therefrom. Examples of such monomers are classified in the following groups.

(1) carboxyl group containing monomer as, for example, acrylic acid, methacrylic acid, crotonic acid, itaconic acid, maleic acid, fumaric acid and the like, (2) hydroxyl group containing monomer as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like, (3) nitrogen containing alkyl acrylate or methacrylate as, for example, dimethylaminoethyl acrylate, dimethylaminoethyl methacrylate and the like, (4) polymerizable amide as, for example, acryl amide, methacryl amide and the like, (5) polymerizable nitrile as, for example, acrylonitrile, methacrylonitrile and the like, (6) alkyl acrylate or methacrylate as, for example, methyl acrylate, methyl methacrylate, ethyl acrylate, n-butyl acrylate, n-butyl methacrylate, 2-ethyl hexyl acrylate and the like, (7) polymerizable glycidyl compound as, for example, glycidyl acrylate, glycidyl methacrylate and the like, (8) $\alpha$-olefin as, for example, ethylene, propylene and the like, (9) vinyl compound as, for example, vinyl acetate, vinyl propionate and the like,

(10) diene compound as, for example, butadiene, isoprene and the like, reaction compounds of the abovesaid monomers as, for example, reaction compound of hydroxyl containing monomer (2) with isocyanate compound, reaction compound of carboxyl containing monomer (1) with glycidyl containing compound and the like.

They may be used each singularly or in combination form. The emulsion polymerization may be carried out in a conventional way, using a polymerization initiator and an appropriate emulsifier. Particularly preferable emulsifiers are acrylic, polyester, alkyd or epoxy resin having in its molecule an amphoionic group of the formula:

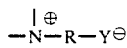

wherein R represents $C_1$ to $C_6$ alkylene or phenylene and $Y^\ominus$ stands for $-COO^\ominus$ or $-SO_3^\ominus$, as disclosed in Japanese Patent Application Kokai No. 129066/83.

In this first step of polymerization, only mono- or 1,1-disubstituted ethylenic bonds may participate in the reaction, giving crosslinked acrylic polymer particles still having unreacted 1,2-di-, 1,1,2-tri- or 1,1,2,2-tetra-substituted ethylenic unsaturation bonds on the surfaces thereof. Therefore, in the next stage of reaction, a polymerizable aromatic compound is added to the abovesaid emulsion and polymerization is continued to effect a graft polymerization between the remaining ethylenic unsaturation bonds and the polymerizable aromatic compound. Since 1,2-di-, 1,1,2-tri- or 1,1,2,2-tetra-substituted ethylenic bond has a selective reactivity towards polymerizable aromatic compound such as styrene, α-methyl styrene, vinyl toluene, t-butyl styrene and the like, a higher grafting rate can be attained with the aforesaid particulate crosslinked polymer coupled with the polymerizable aromatic compound.

It is of course possible to use, besides the required polymerizable aromatic compound, other polymerizable monomers for the preparation of said linear polymer chains as desired. Any of the mono-functional polymerizable monomers hereinbefore stated can be used.

Furthermore, since a certain degree of branching or crosslinking is permissible according to circumstances, a limited amount of crosslinking monomer may be used together, as desired.

The invention is characterized in that the aforesaid linear polymer chains to be chemically bonded to the crosslinked polymer particles should contain a metallic element which is in the left side of the line linking B with Si, As, Te and At, in the long form of the Periodic Table, excluding the members on said line.

As already stated, such metallic element can be advantageously introduced into the linear polymer chains in two different ways.

In one method, a metal containing monomer is present in the abovesaid second stage of reaction together with polymerizable aromatic compound and other optional polymerizable monomers.

Examples of metal containing monomers are metal esters or metal salts of polymerizable organic acids such as acrylic acid, methacrylic acid, itaconic acid, maleic acid and the like, vinyl metals and styryl metals. The metal may also carry a hydroxyl group, an organic acid residue, an alkyl, a substituted alkyl or the like. More specifically, they may be zinc mono (meth) acrylate, zinc di (meth) acrylate, tributyl tin (meth) acrylate, dibutyl tin di (meth) acrylate, dihydroxy Al (meth) acrylate, hydroxy Al di (meth) acrylate, (meth) acryloyl ferrocene, furyl (meth) acryloyl ferrocene, (meth) acryloxy Zr octate, (meth) acryloxy Zr laurate, isopropyl (meth) acryloyl diisostearoyl titanate, isopropyl di (meth) acryloyl isostearoyl titanate, triethyl Ge (meth) acrylate, styryl triethyl germanium, vinyl triethyl germanium, diphenyl Pb di (meth) acrylate, styryl triethyl Pb, and the monomeric compounds represented by the formulae:

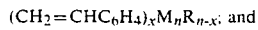

wherein M stands for metallic element; R is alkyl, substituted alkyl, phenyl, substituted phenyl or hydroxyl; R' is hydrogen or methyl; n is the valency of said metallic element; x stands for an integer of less than n. In another method, the composite acrylic resin particles are first prepared and then treated with a metallic compound to introduce the metallic element into the linear polymer chains through esterification or ester-exchange reaction. In this method, the following metallic compounds may be successfully used: magnesium chloride, calcium oxide, chromium chloride, zinc oxide, tributyl tin oxide, dibutyl tin oxide, triethyl tin chloride, tribenzyl tin chloride, diethyl aluminium chloride, aluminium hydroxide, and other metal oxides, halogenides, hydroxides and the like. These compounds may easily react with carboxyl groups or neutralized carboxyl groups in the linear polymer and introduce the metallic elements into said polymer through esterification or ester-exchange reaction. An alkaline metal and an alkaline earth metal such as Na, Ka and Ca may be used in the form of hydroxide and reacted and combined with a carboxyl group of the linear polymer, through an ionic bond. By the adoption of either method, the present composite resin particles each comprising a particulate crosslinked polymer to which a number of substantially linear, metalcontaining polymer chains are chemically bonded can be easily obtained.

It will be appreciated that there are no particular limitations on the kind of radically polymerizable monomers used for the preparation of linear polymer chains. And, hence, the linear polymer chains can be freely designed, and various desired properties may be given to the present composite resin particles by varying the grafting monomers. For example, when the aforesaid monomers (1) or (3) are selected as a part of the monomers to be used for the preparation of linear polymer chains, the composite resin particles having carboxyl or amino containing polymer chains can be obtained, which particles have self-catalytic function in curing, high reactivity with an epoxy compound and are useful in an anionic or cationic electrodeposition. Selection of hydroxyl containing monomer (2) is of great use to give composite resin particles which are to be compounded with a melamine resin and/or an isocyanate compound and cured to give a tough coating.

The aforesaid monomers (4), addition products of hydroxyl containing monomers and monoisocyanate compounds, and addition products of isocyanate containing monomers and monoamide compounds are useful for giving composite crosslinked resin particles with highly crystalline polymer chains, which are beneficial to the products in giving structural viscosity and rheology controllable functions, thereto. Various functional groups, thus, may be carried on the linear polymer chains and utilized as reactive sites or made the best of for their characteristic properties. It is of course possible to select a particular combination of functional monomers and make the most of the characteristic properties of the respective functional group.

The invention has been explained, for ease of understanding, with respect to composite resin particles prepared by only two stage reactions. However, it will be appreciated that multi-stage reactions may likewise be used as desired, as for example, linear polymer particles are partly prepared, followed by the formation of crosslinked polymer core, and linear polymer chains are finally prepared. The present composite resin particles are excellent in dispersion stability in various solvents and resinous varnishes and have the characteristic self-film forming properties. Various functional polymers can be chemically bonded on the surface of particulate crosslinked polymer, and the designed metal element can be introduced into the linear polymer chains, thereby exhibiting the desired properties such as self-catalytic function in curing, bioactive function and the like. Therefore, the present composite resin particles are quite useful in various technical fields, including paint industries, resin molding and other industries.

The invention shall be now more fully explained in the following Examples. Unless otherwise being stated, all parts and percentages are by weight.

REFERENCE EXAMPLE 1

Preparation of dispersion stabilizer Into a 2 liter flask fitted with a stirrer, an air inlet tube, a thermoregulator, a condenser and a decanter, were placed 134 parts of bishydroxy ethyl taurine, 130 parts of neopentylglycol, 236 parts of azelaic acid, 186 parts of phthalic anhydride and 27 parts of xylene and the mixture was heated while removing the formed water azeotropically with xylene. The temperature was raised to 190° C. in about 2 hours from the commencement of reflux and the reaction was continued under stirring and dehydration until the acid value (based on carboxylic acid group) reached 145. Thereafter, the reaction mixture was allowed to cool to 140° C. and to this, 314 parts of Cardura E-10 (glycidyl versatate, trademark of Shell) were dropwise added in 30 minutes at 140° C. The mixture was stirred at the same temperature for 2 hours and then the reaction was stopped to obtain a polyester resin having an acid value of 59, a hydroxyl value of 90 and a number average molecular weight of 1054.

REFERENCE EXAMPLE 2

PREPARATION OF DISPERSION STABILIZER

Into a similar reaction vessel as used in Reference Example 1, were placed 73.5 parts of taurine Na salt, 100 parts of ethyleneglycol, and 200 parts of ethyleneglycol monomethyl ether, and the mixture was heated, under stirring, to 120° C. At the stage when a uniform solution was obtained, a mixture of 470 parts of Epicohto 1001 (bisphenol A diglycidyl ether type epoxy resin, epoxy equivalent 470, trademark of Shell Chem.) and 400 parts of ethyleneglycol monomethyl ether was dropwise added in 2 hours. After completion of said addition, the combined mixture was heated and stirred for 20 hours. Thus obtained product was then purified and dried to obtain 518 parts of modified epoxy resin, whose acid value (measured by KOH titration method) was 49.4 and sulfur content (measured by fluorescent X ray analysis) was 2.8%.

REFERENCE EXAMPLE 3

PREPARATION OF DISPERSION STABILIZER

Into a 1 liter flask fitted with a stirrer, a thermoregulator, dropping funnels, a nitrogen gas inlet tube and a condenser, were placed 140 parts of ethyleneglycol monomethyl ether and 140 parts of xylene, and the mixture was heated to 120° C. To this, a monomer mixture of 74 parts of methyl methacrylate, 70 parts of 2-ethyl hexyl acrylate, 24 parts of 2-hydroxyethyl methacrylate, and 12 parts of methacrylic acid, added with 5 parts of azobisisobutyronitrile and a solution of 20 parts of N-(3-sulfopropyl)-N-3-sulfopropyl)-N-methacryloyloxyethyl-N,N-dimethyl ammonium betaine in 150 parts of ethyleneglycol monoethyl ether were simultaneously and dropwise added in 3 hours. After 30 minutes had elapsed from the completion of said addition, a solution of 0.4 part of t-butylperoxy-2-ethylhexanoate in 8 parts of ethyleneglycol monomethyl ether was added and the combined mixture was kept at 120° C. for 1 hour and thereafter, the solvent was removed off to obtain an amphoionic group containing acrylic resin having a nonvolatile content of 92%.

REFERENCE EXAMPLE 4

PREPARATION OF MONOMER CONTAINING TWO POLYMERIZABLE ETHYLENIC GROUPS EACH HAVING DIFFERENT CO-REACTIVITY

Into a 1 liter flask fitted with a stirrer, an air inlet tube, a thermoregulator, and a condenser, were placed 430 parts of n-butyl maleate and 1.6 parts of hydroquinone and the mixture was heated to 150° C. To this, were dropwise added 373 parts of glycidyl methacrylate in 20 minutes and the combined mixture was maintained at 150° C. for 60 minutes. The reaction was stopped at the stage when the resinous acid value reached 3 KOH mg/g.

EXAMPLE 1

Into a 1 litter flask fitted with a stirrer, a thermoregulator, a dropping funnel, a nitrogen gas inlet tube and a condenser, were placed 330 parts of deionized water and the temperature was raised to 80° C. Separately, a pre-emulsion was prepared by providing an aqueous solution of dispersion stabilizer comprising 12 parts of the amphoionic group containing polyester resin obtained in Reference Example 1, 1.2 parts of dimethyl ethanol amine and 104 parts of deionized water, and gradually adding, while stirring in a Disper, a mixture of 66 parts of methyl methacrylate, 60 parts of n-butyl acrylate, 14 parts of allyl methacrylate and 40 parts of ethyleneglycol dimethacrylate thereto. An aqueous initiator solution was also prepared in a separate vessel, by mixing 2 parts of azobiscyanovaleric acid, 1.3 parts of dimethyl ethanol amine and 40 parts of deionized water.

To the aforesaid reaction flask, the initiator solution and the pre-emulsion were dropwise added, in 80 minutes and 60 minutes, respectively. However, the addition of said preemulsion was started after 10 minutes had elapsed from the commencement of addition of said initiator solution. Then, the combined mixture was kept standing at 80° C. for 30 minutes, dropwise added with a mixture of 12 parts of styrene, 2 parts of methyl methacrylate, 4 parts of n-butyl methacrylate and 2 parts of zinc monomethacrylate and an aqueous solution of 0.8 part of azobiscyanovaleric acid and 0.6 part of dimethyl ethanol amine in 20 parts of deionized water in 20 minutes. The combined mixture was then kept at the same temperature for 1 hour and the reaction was stopped at this stage. Thus obtained emulsion was then subjected to freeze-drying to obtain zinc containing composite resin particles. The zinc containing composite resin particles could be easily dispersed in xylene and in butyl acetate. Viscosities of said dispersions and mean grain diameter of the particles in the respective dispersion were examined and the data obtained were shown in the following Table. Incidentally, the mean grain diameter of the particles in an aqueous emulsion was 150 nm.

TABLE 1

| dispersing medium | viscosity (cp) | mean diameter* (nm) |
|---|---|---|
| xylene | 250 | 185 |
| butyl acetate | 230 | 200 |
| (non volatile content 30%) | | |

*determined by light scattering method

The abovementioned organic solvent dispersions were applied on glass plates by using a doctor blade (20 mils) and dried to obtain clear coatings. Zinc concentration of the xylene dispersion (non-volatile content 30%) was measured by a fluorecent X-ray analyzer and was found to be 4000 ppm to the total solid matters.

EXAMPLE 2

Into a similar reaction vessel as used in Example 1, were placed 330 parts of deionized water which was then heated to 80° C. Next, a pre-emulsion was prepared by providing an aqueous solution of dispersion stabilizer comprising 40 parts of amphoionic group containing acrylic resin obtained in Reference Example 3, 4 parts of dimethyl ethanol amine and 160 parts of deionized water, and gradually adding, while stirring in a Disper, a monomer mixture of 30 parts of methyl methacrylate, 40 parts of n-butyl acrylate, 14 parts of the monomer of Reference Example 4 and 56 parts of ethyleneglycol dimethacrylate. An aqueous initiator solution was also prepared by mixing 2 parts of azobiscyanovaleric acid, 1.3 parts of dimethyl ethanol amine and 40 parts of deionized water.

To the aforesaid reaction vessel, the initiator solution and the pre-emulsion were dropwise added in 65 and 45 minutes, respectively. At that time, the addition of pre-emulsion was started after 10 minutes had elapsed from the commencement of said addition of the initiator solution. After completion of said addition, the combined mixture was kept at 80° C. for 20 minutes, added dropwise with an aqueous initiator solution comprising 0.8 part of azobiscyanovaleric acid, 0.6 part of dimethyl ethanol amine and 20 parts of deionized water in 40 minutes and with a monomer mixture of 18 parts of styrene, 8 parts of methyl methacrylate, 23 parts of n-butyl methacrylate, 10 parts of 2-hydroxyethyl methacrylate and 1 part of methacryloxy zirconium octate in 20 minutes. At that time, the addition of said monomer mixture was started after 10 minutes had elapsed from the commencement of addition of the initiator solution. Thereafter, the combined mixture was reacted at the same temperature for 90 minutes. Thus obtained emulsion was then subjected to freeze-drying to obtain zirconium containing composite resin particles. The resin particles could be easily dispersed in both xylene and butyl acetate. The viscosities of these dispersions and mean grain diameters of the composite resin particles in the dispersions were examined as in Example 1 and are shown in the following Table 2. The mean grain diameter of the composite resin particles in the aqueous emulsion was 120 nm.

TABLE 2

| dispersing medium | viscosity (cp) | mean diameter (nm) |
|---|---|---|
| xylene | 400 | 145 |

TABLE 2-continued

| dispersing medium | viscosity (cp) | mean diameter (nm) |
|---|---|---|
| butyl acetate | 360 | 150 |
| (non-volatile content 30%) | | |

The abovementioned organic solvent dispersions were applied on glass plates by using a doctor blade (20 mils) and dried to obtain clear coatings. Zr content of the xylene dispersion was measured by a fluorecent X-ray analyzer and was found to be 1100 ppm to the total solid matters.

EXAMPLE 3

Using the same reactor and procedures as stated in Example 2, tin containing composite resin particles were prepared, except substituting 23 parts of the amphoionic group containing polyester of Reference Example 1 for 40 parts of the amphoionic group containing acrylic resin of Reference Example 3, and 1 part of tributyl tin methacrylate for 1 part of methacryloxy zirconium octate, as metal containing monomer. Thus obtained composite resin particles showed excellent dispersibility towards xylene and butyl acetate. Viscosities of these dispersions and mean grain diameters of the composite resin particles in said dispersions are shown in the following Table 3. Incidentally, the mean grain diameter of aqueous emulsion of the composite resin particles was 90 nm.

TABLE 3

| dispersion medium | viscosity (cp) | mean diameter (nm) |
|---|---|---|
| xylene | 390 | 110 |
| butyl acetate | 340 | 120 |
| (non-volatile content 30%) | | |

The tin content of the xylene dispersion was 1400 ppm to the total solid matters.

EXAMPLE 4

Into a similar reaction vessel as used in Example 1, were placed 330 parts of deionized water which was then heated to 80° C. Separately, a pre-emulsion was prepared by providing an aqueous solution of dispersion stabilizer comprising 16 parts of the amphoionic group containing polyester resin obtained in Reference Example 1, 1.6 parts of dimethyl ethanol amine and 104 parts of deionized water, and gradually adding, while stirring in a Disper, a monomer mixture of 14 parts of methyl methacrylate, 28 parts of nbutyl acrylate, 18 parts of allyl methacrylate and 60 parts of 1,6-hexanediol dimethacrylate. An aqueous initiator solution was also prepared by mixing 1.6 parts of azobiscyanovaleric acid, 1.1 parts of dimethyl ethanol amine and 40 parts of deionized water.

To the aforesaid reaction vessel, were dropwise added at 80° C. the initiator solution and the pre-emulsion in 50 minutes and 35 minutes, respectively. At that time, the addition of said pre-emulsion was started after 5 minutes had elapsed from the commencement of addition of said initiator solution. After keeping at 80° C. for 30 minutes, an aqueous initiator solution of 1 part of azobiscyanovaleric acid, 0.7 part of dimethyl ethanol amine in 30 parts of deionized water was dropwise added in 45 minutes and a monomer mixture of 28 parts of styrene, 16 parts of methyl methacrylate, 33 parts of n-butyl methacrylate, 3 parts of methacrylic acid and 3.2 parts of dimethyl ethanol amine in 30 minutes. At that time, the addition of said monomer mixture was again started after elapsing 5 minutes from the commencement of addition of said initiator solution. The combined mixture was further reacted at 80° C. for 60 minutes. Thus obtained emulsion was subjected to freeze-drying to obtain the composite resin particles. 60 parts of thus obtained particles were placed in 500 ml round flask and added with 180 parts of xylene. While maintaining the temperature at 70° C., the particles were uniformly dispersed in xylene in an evaporator, 4.3 parts of dibutyl tin oxide were added and the combined mixture was subjected to mixing in the evaporator for 20 minutes. The reaction was stopped at the stage that no further dehydration was detected. Thus obtained xylene dispersion was applied on a glass plate by using a doctor blade (20 mils) and dried to obtain a clear coating. The tin content of said xylene dispersion was 8500 ppm to the total solid matters.

EXAMPLE 5

Repeating the same experiments as stated in Example 4 except substituting 4.2 parts of diethyl aluminium chloride for 4.3 parts of dibutyl tin oxide, a xylene dispersion of aluminium containing composite resin particles was prepared.

Thus obtained xylene dispersion was applied by a doctor blade (20 mils) to a glass plate and dried to obtain a clear coating. The aluminium content was 3800 ppm to the total solid matters.

What is claimed is:

1. A process for preparing composite resin particles comprising:
    a first step of effecting an emulsion polymerization of a monomer mixture of
    (i) a polyfunctional monomer having one or more mono-substituted or 1,1-di-substituted ethylenic bonds and one or more 1,2-di-substituted, 1,1,2-tri-substituted or 1,1,2,2-tetra-substituted ethylenic bonds,
    (ii) a crosslinking monomer having in its molecule 2 or more $\alpha,\beta$-ethylenically unsaturated bonds which are reactive with said mono-substituted or 1,1-di-substituted ethylenic bonds of the polyfunctional monomer, or a combination of two compounds each having a mutually reactive functional group and one or more $\alpha,\beta$-ethylenically unsaturated bonds which are reactive with said mono-substituted or 1,1-di-substituted ethylenic bonds of the polyfunctional monomer, and
    (iii) other $\alpha,\beta$-ethylenic monomer which are reactive with said mono-substituted or 1,1-di-substituted ethylenic bonds of the polyfunctional monomer, to obtain an emulsion of particulate materials of crosslinked polymer still having 1,2-di-substituted, 1,1,2-tri-substituted or 1,1,2,2-tetra-substituted ethylenic bonds remaining in a free state in the crosslinked polymer, and
    a second step of effecting a graft polymerization between said particulate materials of crosslinked polymer and a monomer mixture of a polymerizable aromatic compound which is selectively reactive with 1,2-di-substituted, 1,1,2-tri-substituted or 1,1,2,2-tetra-substituted ethylenic bonds, a metal-containing monomer and other $\alpha,\beta$-ethylenically unsaturated compounds with the former two, thereby forming substantially linear metal-containing polymer chains on said crosslinked particulate materials.

2. The process according to claim 1, wherein the metal-containing monomer is a compound having a metallic element selected from the group consisting of Zn, Sn, Al, Fe, Zr, Ti, Ge and Pb and a polymerizable ethylenic bond.

3. The process according to claim 1, wherein the polyfunctional monomer having one or moremono-substituted or 1,1-di-substituted ethylenic bonds and one or more 1,2-di-substituted, 1,1,2-tri-substituted or 1,1,2,2-tetra-substituted ethylenic bonds is selected from the group consisting of an addition product of allyl glycidyl ether and (meth) acrylic acid, an addition product of monoallyl amine or diallyl amine and glycidyl (meth) acrylate or isocyanate bearing (meth) acryloyl group, an addition product of allylalcohol and isocyanate bearing (meth) acryloyl group, an addition product of maleic acid or fumaric acid and glycidyl (meth) acrylate, an addition product of maleic or fumaric monoester and glycidyl (meth) acrylate and an addition product of fatty acid having an unsaturated bond and glycidyl (meth) acrylate.

* * * * *